United States Patent [19]

Krahn

[11] Patent Number: 5,312,151
[45] Date of Patent: May 17, 1994

[54] BOOT PROTECTOR

[76] Inventor: John Krahn, c/o Paul D. Gornall, Barrister & Solicitor, 960 - 355 Burrard St., Vancouver, B.C., V6C 2G8, Canada

[21] Appl. No.: 26,879

[22] Filed: Mar. 5, 1993

[51] Int. Cl.[5] .............................................. B60N 3/06
[52] U.S. Cl. .................................... 296/75; 296/97.23
[58] Field of Search ............................. 296/75, 97.23; 180/90.6

[56] References Cited

U.S. PATENT DOCUMENTS

| | | | |
|---|---|---|---|
| 837,021 | 11/1906 | Winters | 296/75 X |
| 2,410,412 | 11/1946 | Hurford | 180/90.6 |
| 3,114,272 | 12/1963 | Sawyer | 296/97.23 X |
| 4,262,048 | 4/1981 | Mitchell | 296/97.23 X |
| 4,910,061 | 3/1990 | St. Julian | 296/75 X |

FOREIGN PATENT DOCUMENTS

| | | | |
|---|---|---|---|
| 4030766 | 4/1991 | Fed. Rep. of Germany | 180/90.6 |
| 4129885 | 4/1992 | Japan | 180/90.6 |

OTHER PUBLICATIONS

"The Shoesaver" Star Crest of California, Stock No. 2-23022-5 Sep. 22, 1987.

Primary Examiner—David M. Mitchell
Assistant Examiner—Gary C. Hoge

[57] ABSTRACT

This invention relates to protective devices for placement under the heel of a vehicle driver's footwear. In particular the invention discloses a protector pad device that elevates the back of the driver's boot or shoe above the floor of the vehicle to prevent the heel from contacting or remaining in any mud, snow and water located on the vehicle floor. The device is releasably attached to the vehicle floor or mat with mechanically adhesive strips. The device has a extended contoured depression to guide the driver's foot into proper placement for safety and ease of pivotting of the foot from accelerator pedal to brake pedal during the operation of the vehicle. The device is thickened on the side that is to be located away from the center of the vehicle in order to provide a more level platform for the boot's heel in the usual situation where the vehicle's floor slopes down from the center of the vehicle out toward the driver's side door.

1 Claim, 1 Drawing Sheet

BOOT PROTECTOR

FIELD OF THE INVENTION

This invention relates to protective devices for placement under the heel of a vehicle driver's footwear. In particular the invention discloses a boot protector pad device that elevates the back of the driver's boot or shoe above the floor of the vehicle to prevent the heel from contacting or remaining in any mud, snow and water located on the vehicle floor. The device also keeps the driver's boot in one location in relation to the accelerator and brake pedals, providing orientation and safety in the use of the respective pedals.

DESCRIPTION OF THE PRIOR TECHNOLOGY

A number of preexisting devices relate to the present invention: these include: a heel protector for mounting with snaps to a vehicle floor, a floor covering for a vehicle that elevates the driver's footwear by means of a series of graduated steps, a shoe guard mat for vehicles comprising three sandwiched materials in which interlocking strip fasteners are used to removeably attach the guard to the flooring of the vehicle, a spur-like shoe protector for use by the driver of a vehicle, a shoe heel protector for use on a vehicle floor in which an upper convoluted surface has peaks to support the heel and valleys with heel barriers to collect debris away from contact with the heel. None of the prior technology comprises the features of the present invention.

SUMMARY OF THE PRESENT INVENTION

The boot protector of the present invention is releasably attached to the vehicle floor or mat with mechanically adhesive strips. The device comprises a main body formed of wood, plastic or other suitable material. The main body has an extended contoured depression to guide the driver's foot into proper placement and to allow the pivotting of the foot from gas pedal to brake pedal during the operation of the vehicle. The device is thickened on the side that is to be located away from the center of the vehicle in order to provide a more level platform for the boot's heel in the usual situation where the vehicle's floor slopes down from the center of the vehicle out toward the driver's side door.

DETAILED DESCRIPTION

Figure 1:
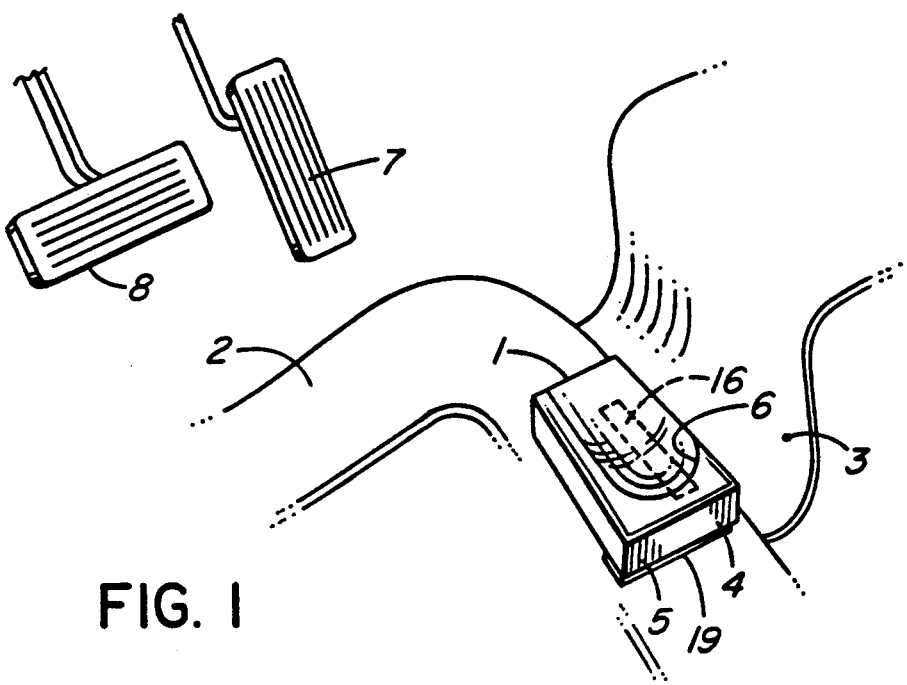
FIG. 1 is a perspective view of the boot protector in position in on the floor mat of a vehicle.

Referring to FIG. 1, the boot protector 1 is positioned on the floor mat 2, up against the transmission or central hump 3. The protector 1 is thinner on the hump side 4 than on the other side, to give greater overall levelling of the top of the boot protector when placed on a typically sloping vehicle floor. The heel of the driver's boot would fit into the extended depression formed along contour ridge 6, from which the driver's foot can pivot on the protector to operate the accelerator pedal 7 and to operate the brake pedal 8. The contour ridge 6 extends around the back area and along the non-hump side area of the boot protector in order to keep the user's boot from slipping backwards or sideways away from the central hump. On the bottom of the boot protector are a side strip and a back end strip of mechanically adhesive material, adapted to detachably engage with complementary strips 16 and 19 of mechanically adhesive material affixed to the floor of the vehicle or the floor mat, adjacent to the central hump.

Figure 2:
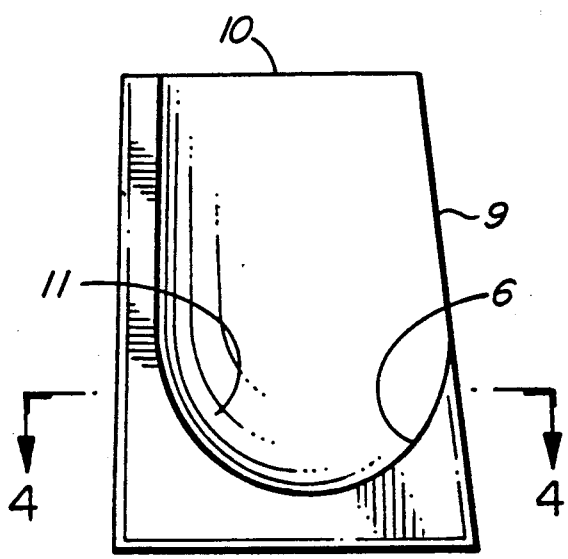
FIG. 2 is a top view of the device of FIG. 1.

Referring to FIG. 2, the boot protector's hump side 9, the front 10 and the contour ridge 6 define the extended depression 11. More specifically, the extended contoured depression is defined by a portion of the front top edge of the main body, by an adjacent portion of a vehicle hump side top edge of the main body, and by the contour ridge 6 that extends on the top surface of the main body from the front top edge back toward the back area of the main body and thence extends in a curve toward and eventually joining with the vehicle hump side top edge of the main body. The defining contour ridge 6 thus helps the driver orient his boot on the floor in relation to the accelerator pedal 7 and the brake pedal 8. The boot protector thus helps the driver to locate the desired pedal in the course of driving.

Figure 3:
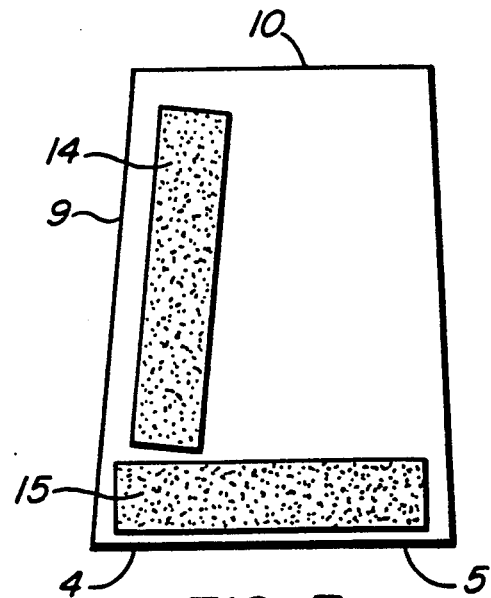
FIG. 3 is a bottom view of the device of FIG. 1.

Referring to FIG. 3, the bottom of the boot protector has a side strip 14 of and a back end strip 15 of mechanically adhesive material, adapted to detachably engage with complementary strips of mechanically adhesive material affixed to the floor of the vehicle or the floor mat, adjacent to the central hump. The front 10, the hump side 9, the hump side end 4 and the other side end 5 are shown.

Figure 4:
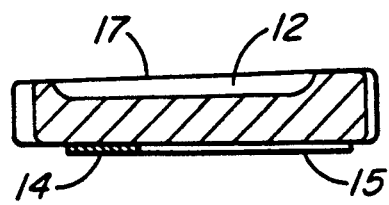
FIG. 4 is a cross-sectional frontal view of the device of FIG. 1.

Referring to FIG. 4, a cross-section taken along section line 18 from FIG. 2 shows the side strip 14 and the back end strip 15 of mechanically adhesive material on the bottom of the boot protector. The lateral back face 12 of the contour ridge 6 keeps the user's boot from slipping back onto the back top surface 17 and keeps the boot in place in the extended depression.

The within-described invention may be embodied in other specific forms and with additional options and accessories without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the meaning and range of equivalence of the claims are therefore intended to be embraced therein.

I claim:

1. A device for detachable placement on the floor of a vehicle to elevate and orient the boot heel of a vehicle driver's footwear, comprising a main body having an extended contoured depression adapted to receive the boot heel and keep it from from slipping backwards or sideways from a central hump of the vehicle, the extended contoured depression being defined by a portion of the front top edge of the main body, by an adjacent portion of a vehicle hump side top edge of the main body, and by a contour ridge that extends on the top surface of the main body from the front top edge back toward the back area of the main body and thence extends in a curve toward and eventually joining with the vehicle hump side top edge of the main body, in which the vehicle hump side portion of the main body is thinner than an opposite side portion of the main body, and in which the main body has a bottom surface to which is affixed a side strip and a back end strip of mechanically adhesive material, adapted to detachably engage with complementary strips of mechanically adhesive material affixed to the floor of the vehicle.

* * * * *